(12) United States Patent
Chang et al.

(10) Patent No.: US 10,394,077 B2
(45) Date of Patent: Aug. 27, 2019

(54) BACKLIGHT MODULE

(71) Applicant: Au Optronics Corporation, Hsinchu (TW)

(72) Inventors: Chi-Sheng Chang, Taipei (TW); Jian-Li Huang, Changhua County (TW); Wei-Chun Chung, Keelung (TW); Su-Yi Lin, New Taipei (TW)

(73) Assignee: Au Optronics Corporation, Hsinchu (TW)

( * ) Notice: Subject to any disclaimer, the term of this patent is extended or adjusted under 35 U.S.C. 154(b) by 267 days.

(21) Appl. No.: 14/809,281

(22) Filed: Jul. 27, 2015

(65) Prior Publication Data

US 2016/0298828 A1 Oct. 13, 2016

(30) Foreign Application Priority Data

Apr. 9, 2015 (TW) .............................. 104111560 A

(51) Int. Cl.
*G02F 1/1335* (2006.01)

(52) U.S. Cl.
CPC .. *G02F 1/133606* (2013.01); *G02F 1/133603* (2013.01); *G02F 1/133605* (2013.01); *G02F 2001/133614* (2013.01)

(58) Field of Classification Search
CPC ............ G02F 1/1336; G02F 1/133606; G02F 1/133609; G02F 1/133611; G02F 1/133602; G02F 1/133603
See application file for complete search history.

(56) References Cited

U.S. PATENT DOCUMENTS

| 5,473,396 A | * | 12/1995 | Okajima | ............... H01J 9/2271 348/786 |
| 7,903,194 B2 | * | 3/2011 | Epstein | ................ G02B 5/0247 349/61 |
| 8,698,980 B2 | | 4/2014 | Chao et al. | |
| 9,164,316 B2 | | 10/2015 | Chao et al. | |
| 9,605,832 B2 | | 5/2017 | Yamanaka et al. | |
| 9,897,286 B2 | | 2/2018 | Yamanaka et al. | |
| 2004/0169802 A1 | | 9/2004 | Yun et al. | |

(Continued)

FOREIGN PATENT DOCUMENTS

| CN | 1991512 | 7/2007 |
| CN | 101281322 | 10/2008 |

(Continued)

*Primary Examiner* — Karabi Guharay
*Assistant Examiner* — Nathaniel J Lee
(74) *Attorney, Agent, or Firm* — JCIPRNET

(57) ABSTRACT

A backlight module including a light source, an optical wavelength conversion film, a first group of optical films, and a second group of optical films is provided. The light source is adapted to emit a first light. The optical wavelength conversion film is adapted to convert the first light into a second light with a different wavelength. The first group of optical films is disposed between the light source and the optical wavelength conversion film. The optical wavelength conversion film is disposed between the first group of optical films and the second group of optical films, wherein a ratio of a transmittance of the second group of optical films for the second light to a transmittance of the first group of optical films for the first light is larger than or equal to 45%. Thus, the backlight module has a uniform light-emitting color.

23 Claims, 10 Drawing Sheets

(56) References Cited

U.S. PATENT DOCUMENTS

| | | | |
|---|---|---|---|
| 2009/0128914 A1* | 5/2009 | Lee | G02B 5/0215 359/599 |
| 2009/0296375 A1* | 12/2009 | Iwamoto | G02F 1/133606 362/97.2 |
| 2010/0128464 A1* | 5/2010 | Joo | G02F 1/133606 362/97.1 |
| 2010/0238648 A1* | 9/2010 | Tsukahara | G02B 6/005 362/97.1 |
| 2011/0164203 A1* | 7/2011 | Kimura | G02B 6/0003 349/62 |
| 2012/0147292 A1* | 6/2012 | Kasano | G02F 1/1335 349/64 |
| 2013/0009180 A1 | 1/2013 | Kim et al. | |
| 2013/0057806 A1* | 3/2013 | Kanemitsu | G02F 1/133603 349/64 |
| 2013/0120678 A1 | 5/2013 | Chao et al. | |
| 2014/0125898 A1 | 5/2014 | Chao et al. | |
| 2014/0153216 A1* | 6/2014 | Yamanaka | F21V 5/04 362/84 |
| 2017/0159911 A1 | 6/2017 | Yamanaka et al. | |

FOREIGN PATENT DOCUMENTS

| | | |
|---|---|---|
| CN | 101424755 | 5/2009 |
| CN | 102506327 | 6/2012 |
| CN | 103487857 | 1/2014 |
| CN | 103717963 | 4/2014 |
| CN | 203519970 | 4/2014 |
| CN | 203586083 | 5/2014 |
| CN | 203773876 | 8/2014 |
| CN | 201410712319 | 12/2014 |
| TW | I258044 | 7/2006 |
| TW | 201239239 | 10/2012 |
| TW | 201319709 | 5/2013 |

\* cited by examiner

BACKLIGHT MODULE

CROSS-REFERENCE TO RELATED APPLICATION

This application claims the priority benefit of Taiwan application serial no. 104111560, filed on Apr. 9, 2015. The entirety of the above-mentioned patent application is hereby incorporated by reference herein and made a part of this specification.

BACKGROUND OF THE INVENTION

Field of the Invention

The invention relates to a backlight module.

Description of Related Art

In recent years, as electronic products become common, the display panel that provides the display function for the electronic products has come into focus among designers. There are various types of display panels that can be selected for use according to the designs of the electronic products. Some of them are not provided with a light-emitting function, and thus a backlight module needs to be disposed under the display panel to serve as a light source, so as to achieve the display function.

Such a backlight module usually includes an assembly frame, a light source, and a light guide plate. According to a relationship between the light source and the light guide plate, backlight modules may be categorized into two types, which are direct type backlight module and edge type backlight module. Take the direct type backlight module as an example, the light source and the light guide plate are installed in the assembly frame, wherein the light source is located under the light guide plate, such that the light emitted by the light source is guided by the light guide plate to be emitted out of the backlight module. In addition, the backlight module may use a variety of types of optical films as required, such as a prism film, a diffusion film, a brightness enhancement film (BEF), a polarizer film, and other suitable optical films. The optical film is disposed on two opposite sides of the light guide plate for adjusting a transmission path or distribution of the light emitted by the light source.

In order to improve the mura phenomenon, i.e. non-uniform brightness distribution, of the display device that uses the backlight module, the backlight module may use a perforated reflective film having high reflectivity to adjust the transmission path and distribution of the light emitted by the light source. The perforated reflective film has a plurality of perforations, and the number or area of the perforations differs between different regions so as to differentiate the light transmission amounts in these regions. For example, fewer or smaller perforations are formed in a region of the perforated reflective film corresponding to the top of the light source, so as to reduce the light transmission amount. In contrast thereto, more or larger perforations are formed in another region of the perforated reflective film not corresponding to the light source so as to increase the light transmission amount. Accordingly, the light emitted by the light source first passes through the perforated reflective film for adjusting the distribution profile before being transmitted outward, by which the uniformity of the light is improved.

In addition, for the backlight module to achieve wide color gamut (WCG), the backlight module may use blue light emitting diodes (LED) accompanied with a quantum dot enhancement film (QDEF). The quantum dot enhancement film converts part of the light emitted by the light source into a light having a different wavelength. For example, partial blue light is converted into a yellow light, and then the two lights having different wavelengths are mixed to produce a white light. Due to the perforated reflective film disposed in the backlight module, there is more light reflection between the quantum dot enhancement film and the region with fewer perforations of the perforated reflective film (i.e. the region corresponding to the top of the light source). As a result, in the region above the light source, more light is converted into the yellow light, which causes the overall light-emitting color of the backlight module to be non-uniform, and this phenomenon is called color shift.

SUMMARY OF THE INVENTION

The invention provides a backlight module that improves color shift and has a uniform light-emitting color.

The invention provides a backlight module that includes a light source, an optical wavelength conversion film, a first group of optical films, and a second group of optical films. The light source emits a first light. The first group of optical films is disposed between the light source and the optical wavelength conversion film. The optical wavelength conversion film is disposed between the first group of optical films and the second group of optical films. The first light passes through the first group of optical films and is converted into a second light having a different wavelength by the optical wavelength conversion film, and the second light passes through the second group of optical films, wherein a ratio of a transmittance of the second group of optical films for the second light to a transmittance of the first group of optical films for the first light is larger than or equal to 45%.

The invention provides a backlight module that includes a light source, an optical wavelength conversion film, a first group of optical films, a second group of optical films, and an optical control film. The light source emits a first light. The optical wavelength conversion film converts the first light into a second light having a different wavelength. The first group of optical films is disposed between the light source and the optical wavelength conversion film, wherein the first group of optical films includes a prism film. The optical wavelength conversion film is disposed between the first group of optical films and the second group of optical films. The optical control film is disposed between the first group of optical films and the light source, and a light transmission amount of a first region of the optical control film is different from a light transmission amount of a second region of the optical control film. The first region corresponds to the light source while the second region corresponds to an area around the light source and surrounds the first region.

The invention provides a backlight module that includes a light source, an optical wavelength conversion film, a first group of optical films, a second group of optical films, and a lens. The light source emits a first light. The optical wavelength conversion film converts the first light into a second light having a different wavelength. The first group of optical films is disposed between the light source and the optical wavelength conversion film, wherein the first group of optical films includes a prism film. The optical wavelength conversion film is disposed between the first group of optical films and the second group of optical films. The lens is disposed between the light source and the first group of optical films to reflect or refract the first light.

Based on the above, the backlight module of the invention includes the first group of optical films and the second group of optical films that are respectively disposed on two opposite sides of the optical wavelength conversion film, such that the first light emitted by the light source is converted by the optical wavelength conversion film into the second light having a different wavelength after passing through the first group of optical films, and then the second light passes through the second group of optical films. In other words, the first group of optical films is disposed between the optical wavelength conversion film and the light source to improve the light mixing effect of the first light. Thereby, the backlight module of the invention utilizes the specific ratio of the transmittance of the second group of optical films for the second light to the transmittance of the first group of optical films for the first light to improve color shift, so as to produce a uniform light-emitting color.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1A:
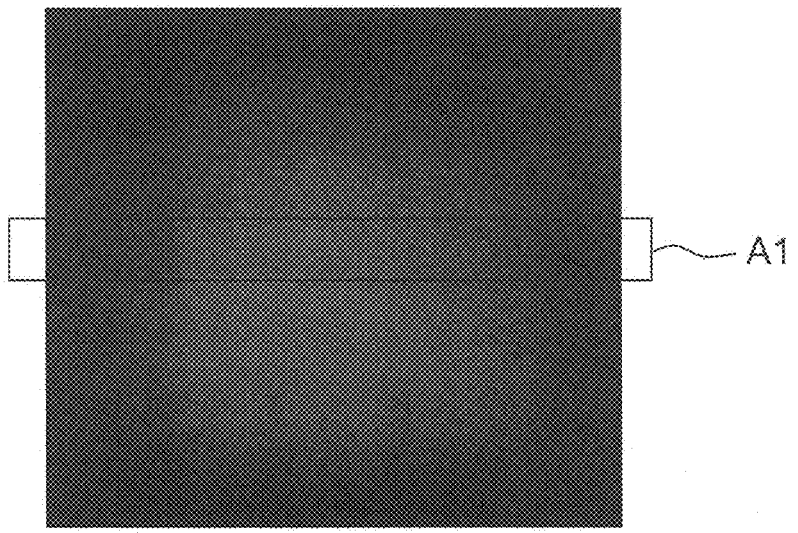
FIG. 1A through FIG. 1I illustrate light-emitting colors of a backlight module according to several embodiments of the invention.
Figure 1B:
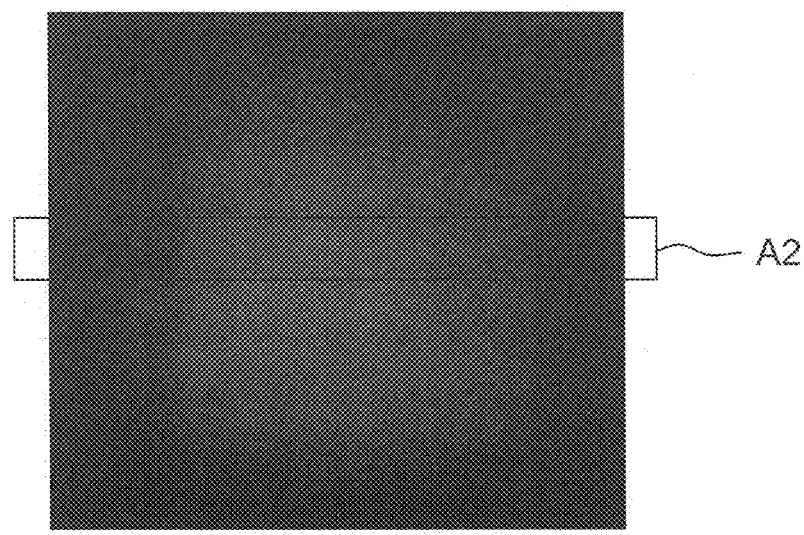
Figure 1C:
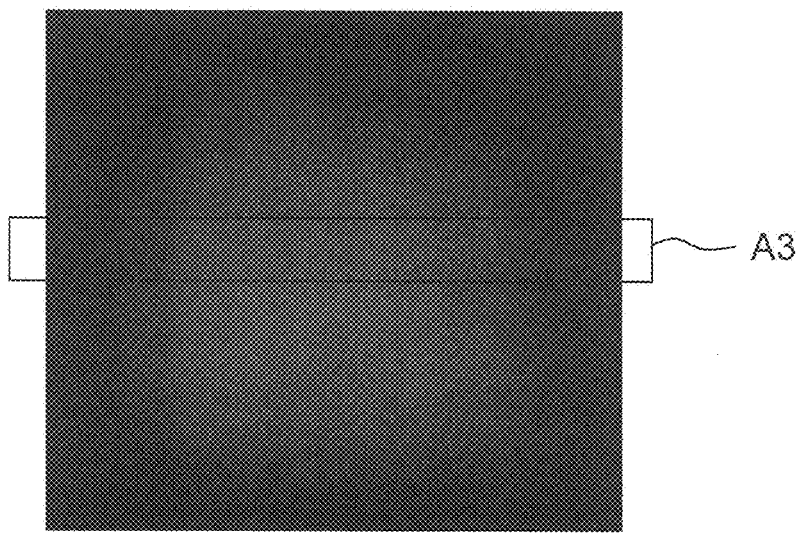
Figure 1D:
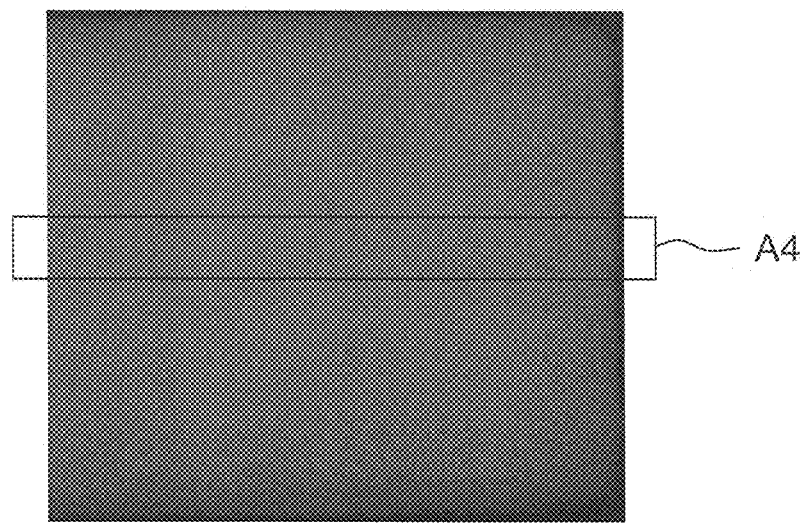

In a backlight module of the invention, an optical control film and an optical wavelength conversion film are disposed sequentially above a light source, and an optical film is disposed above and/or under the optical wavelength conversion film. Alternatively, in a backlight module of the invention, a lens and an optical wavelength conversion film are disposed sequentially above a light source, and an optical film is disposed above and/or under the optical wavelength conversion film. The optical wavelength conversion film is capable of converting a light emitted by the light source into a light having a different wavelength, and the lights having two different wavelengths are mixed to be emitted out of the backlight module. Accordingly, the light-emitting effect of the backlight module (e.g. uniformity of the light-emitting color) is adjusted based on the type of the optical film above and/or under the optical wavelength conversion film and whether the optical film is disposed. Below the simulation results of several embodiments are described with reference to Table 1 and FIG. 1A through FIG. 1I. FIG. 1A through FIG. 1I illustrate the light-emitting colors of the backlight module according to several embodiments of the invention.

TABLE 1

|   | A | B | C | D | E | Upper transmittance | Lower transmittance | Ratio |
|---|---|---|---|---|---|---|---|---|
| 1 | DBEF | prism film | prism film | diffusion film | conversion film | 2.49% | 100% | 2.49% |
| 2 | DBEF | prism film | diffusion film | conversion film | N/A | 4.68% | 100% | 4.68% |
| 3 | DBEF | prism film | diffusion film | conversion film | diffusion film | 4.68% | 70% | 6.69% |
| 4 | DBEF | prism film | diffusion film | conversion film | prism film | 4.68% | 50% | 9.36% |
| 5 | DBEF | prism film | diffusion film | conversion film | diffusion film | 4.68% | 10% | 46.8% |
| 6 | DBEF | prism film | diffusion film | conversion film | prism film | 4.68% | 5% | 93.6% |
| 7 | DBEF | diffusion film | prism film | conversion film | prism film | 4.68% | 5% | 93.6% |
| 8 | DBEF | diffusion film | N/A | conversion film | prism film | 43.26% | 5% | 865.2% |
| 9 | DBEF | conversion film | prism film | diffusion film | N/A | 48.50% | 4.93% | 983.7% |

In the above Table 1, the "conversion film" is the aforementioned optical wavelength conversion film, the "upper transmittance" is the transmittance of the light in an upper region of the optical wavelength conversion film (upper side of a light exit surface of the optical wavelength conversion film, i.e. the region where the light has passed through the optical wavelength conversion film), the "lower transmittance" is the transmittance of the light in a lower region of the optical wavelength conversion film (lower side of a light receiving surface of the optical wavelength conversion film, i.e. the region where the light is about to pass through the optical wavelength conversion film), and the "ratio" is a ratio of the transmittance of the light in the upper region of the optical wavelength conversion film to the transmittance in the lower region of the optical wavelength conversion film. Each line represents one embodiment, and the reference numbers A to E in each line respectively represent the optical films arranged from top to bottom above the light source in the respective embodiment. In addition, the backlight module may further include a component, other than the optical films, above the optical wavelength conversion film for adjusting the transmittance of the light in the upper region of the optical wavelength conversion film. Nevertheless, the following paragraphs only discuss the results based on the types of the optical films and whether the optical films are disposed.

Take Embodiment 1 as an example, a reflective polarizing brightness enhancement film (DBEF), two prism films, a diffusion film, and an optical wavelength conversion film are disposed from top to bottom above the light source. Thus, no optical film is disposed under the optical wavelength conversion film. Accordingly, in the backlight module of Embodiment 1, the transmittance of the light in the upper region of the optical wavelength conversion film is 2.49% and the transmittance in the lower region is 100% (because no optical film is disposed in the lower region), such that the ratio of the transmittance of the light in the upper region of the optical wavelength conversion film to the transmittance in the lower region is about 2.49%. Here, the light emitted by the light source does not pass through any optical film before being converted by the optical wavelength conversion film. Therefore, the light amount at a portion of the optical wavelength conversion film corresponding to the light source is larger than the light amount at a portion of the optical wavelength conversion film corresponding to the area around the light source. As a result, the backlight module generates non-uniform brightness, and the brightness of the area corresponding to the light source is obviously different from the brightness of the other areas. Therefore, the backlight module has an obvious color shift, as indicated by the yellowish strips in the area A1 of FIG. 1A.

Embodiment 2 does not include the prism film, which is disposed above the optical wavelength conversion film according to Embodiment 1, but similar to Embodiment 1, there is no optical film disposed under the optical wavelength conversion film in Embodiment 2. Accordingly, in the backlight module of Embodiment 2, the transmittance of the light in the upper region of the optical wavelength conversion film is improved to 4.68% while the transmittance in the lower region remains 100%, such that the ratio of the transmittance of the light in the upper region of the optical wavelength conversion film to the transmittance in the lower region is about 4.68%. Here, the light emitted by the light source does not pass through any optical film before being converted by the optical wavelength conversion film. Therefore, the light amount at a portion of the optical wavelength conversion film corresponding to the light source is larger than the light amount at a portion of the optical wavelength conversion film corresponding to the area around the light source. As a result, the backlight module generates non-uniform brightness and has an obvious color shift, as indicated by the yellowish strips in the area A2 of FIG. 1B. It is known from the above that adjusting the composition of the optical films above the optical wavelength conversion film does not effectively improve the color shift of the backlight module.

In contrast to the above, in Embodiment 3, a reflective polarizing brightness enhancement film, a prism film, and a diffusion film are disposed above the optical wavelength conversion film while another diffusion film is disposed under the optical wavelength conversion film. Accordingly, in the backlight module of Embodiment 3, the transmittance of the light in the upper region of the optical wavelength conversion film is 4.68% while the transmittance in the lower region is adjusted to 70%, such that the ratio of the transmittance of the light in the upper region of the optical wavelength conversion film to the transmittance in the lower region is about 6.69%. Here, the light emitted by the light source first passes through the diffusion film disposed under the optical wavelength conversion film to be diffused uniformly before being converted by the optical wavelength conversion film, by which a difference between the light amount at the portion of the optical wavelength conversion film corresponding to the light source and the light amount at the portion of the optical wavelength conversion film corresponding to the area around the light source is reduced. As a result, even though the backlight module of Embodiment 3 still has the aforementioned color shift (as indicated by the yellowish strips in the area A3 of FIG. 1C), the color shift is improved in comparison to Embodiments 1 and 2.

Similarly, in Embodiment 4, a prism film is disposed under the optical wavelength conversion film in place of the diffusion film disposed under the optical wavelength conversion film in Embodiment 3. Accordingly, in the backlight module of Embodiment 4, the transmittance of the light in the upper region of the optical wavelength conversion film is 4.68% while the transmittance in the lower region is 50%, such that the ratio of the transmittance of the light in the upper region of the optical wavelength conversion film to the transmittance in the lower region is about 9.36%. Here, the light emitted by the light source first passes through the prism film disposed under the optical wavelength conversion film to be reflected or refracted before being converted by the optical wavelength conversion film, by which the difference between the light amount at the portion of the optical wavelength conversion film corresponding to the light source and the light amount at the portion of the optical wavelength conversion film corresponding to the area around the light source is reduced. As a result, even though the backlight module of Embodiment 4 still has the aforementioned color shift (as indicated by the area A4 of FIG. 1D), the color shift is improved in comparison to Embodiments 1 and 2.

Figure 1E:
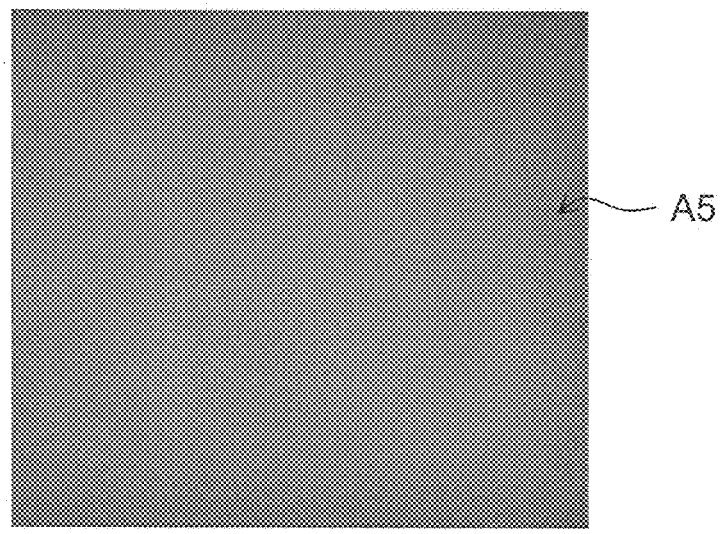

Further, Embodiment 5 has a component composition similar to that of Embodiment 3. In Embodiment 5, a reflective polarizing brightness enhancement film, a prism film, and a diffusion film are disposed above the optical wavelength conversion film while another diffusion film is disposed under the optical wavelength conversion film, but the diffusion film has a lower transmittance than the diffusion film of Embodiment 3. Accordingly, in the backlight module of Embodiment 5, the transmittance of the light in the upper region of the optical wavelength conversion film is 4.68% while the transmittance in the lower region is adjusted to 10%, such that the ratio of the transmittance of the light in the upper region of the optical wavelength conversion film to the transmittance in the lower region is about 46.8%. Similarly, the light emitted by the light source first passes through the diffusion film disposed under the optical wavelength conversion film to be diffused uniformly before being converted by the optical wavelength conversion film, and since the transmittance of the light in the lower region of the optical wavelength conversion film is reduced, the light does not easily pass compared to the foregoing embodiments. Thus, the difference between the light amount at the portion of the optical wavelength conversion film corresponding to the light source and the light amount at the portion of the optical wavelength conversion film corresponding to the area around the light source is reduced. Accordingly, the backlight module of Embodiment 5 does not have an obvious color shift. As shown in FIG. 1E, the area A5 which corresponds to the aforementioned areas A1 to A4 does not have the yellowish strips.

Figure 1F:
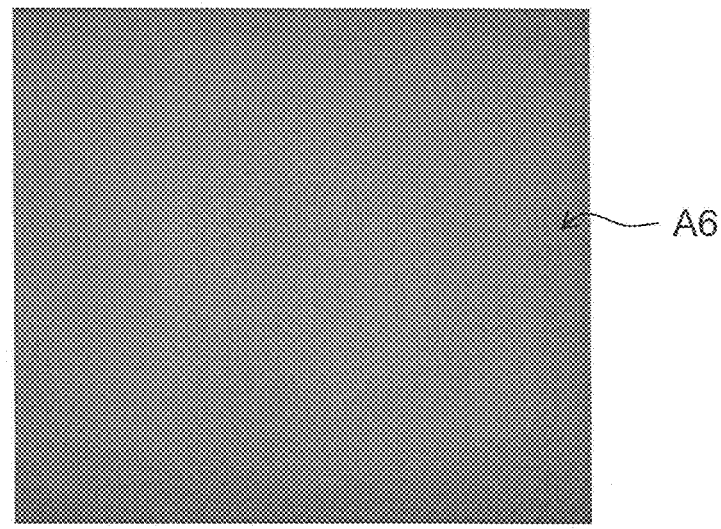

Embodiment 6 has a component composition similar to that of Embodiment 4. In Embodiment 6, a reflective polarizing brightness enhancement film, a prism film, and a diffusion film are disposed above the optical wavelength conversion film while another prism film is disposed under the optical wavelength conversion film, but the prism film has a lower transmittance than the diffusion prism film of Embodiment 4. Accordingly, in the backlight module of Embodiment 6, the transmittance of the light in the upper region of the optical wavelength conversion film is 4.68% while the transmittance in the lower region is 5%, such that the ratio of the transmittance of the light in the upper region of the optical wavelength conversion film to the transmittance in the lower region is 93.6%. Similarly, the light emitted by the light source first passes through the prism film disposed under the optical wavelength conversion film to be reflected or refracted before being converted by the optical wavelength conversion film, and since the transmittance of the light in the lower region of the optical wavelength conversion film is reduced, the light does not easily pass compared to the foregoing embodiments. Thus, the difference between the light amount at the portion of the optical wavelength conversion film corresponding to the light source and the light amount at the portion of the optical wavelength conversion film corresponding to the area around the light source is reduced. Accordingly, the backlight module of Embodiment 6 does not have an obvious color shift. As shown in FIG. 1F, the area A6 which corresponds to the aforementioned areas A1 to A4 does not have the yellowish strips.

Figure 1G:
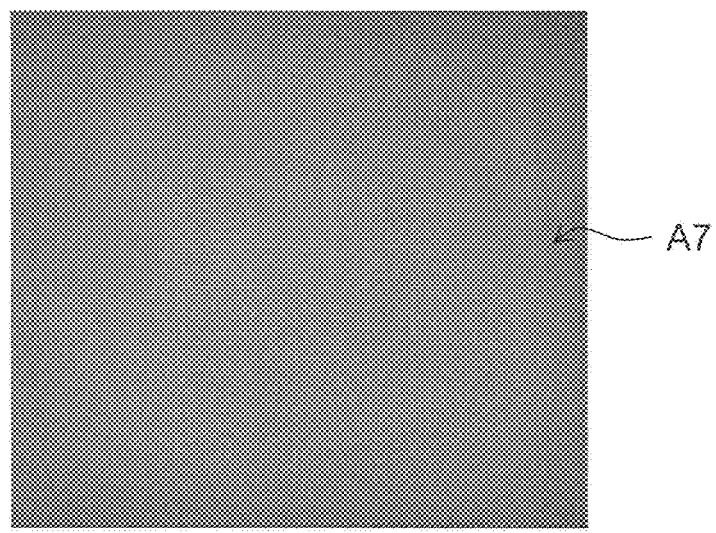
Figure 1H:
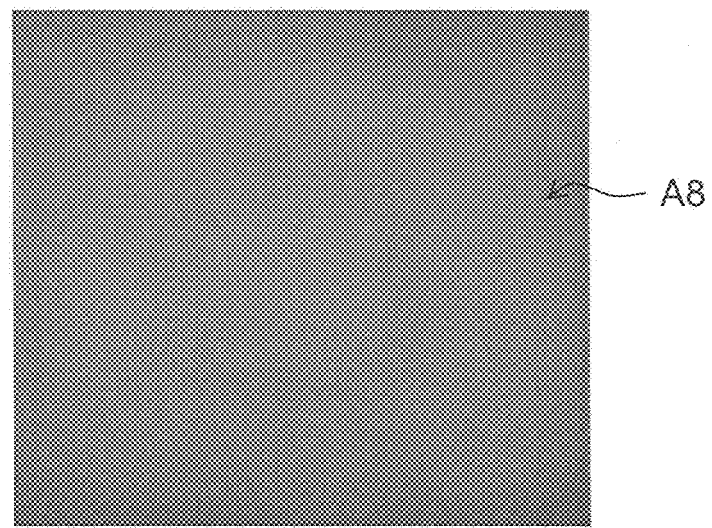
Figure 1I:
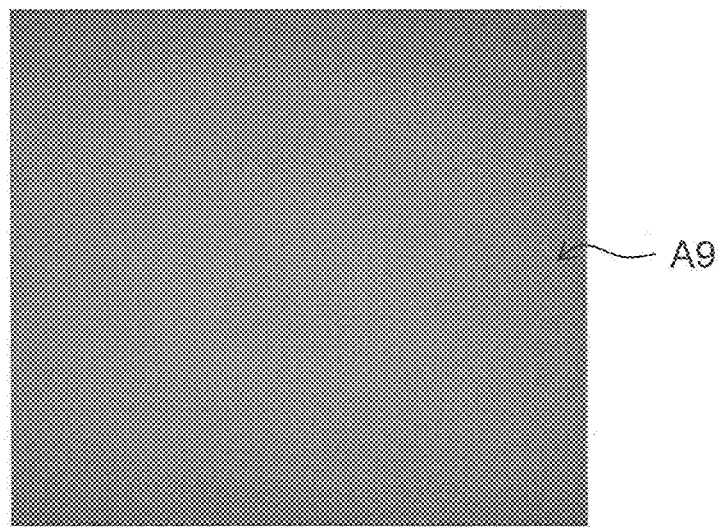

In Embodiment 7, the positions of the prism film and the diffusion film, which are disposed above the optical wavelength conversion film in Embodiment 6, are adjusted. Accordingly, in the backlight module of Embodiment 7, the transmittance of the light in the upper region of the optical wavelength conversion film is 4.68% while the transmittance in the lower region is 5%, such that the ratio of the transmittance of the light in the upper region of the optical wavelength conversion film to the transmittance in the lower region is 93.6%. It is known from the above that adjusting the positions of the optical films above the optical wavelength conversion film does not affect the light emitting effect of the backlight module. Accordingly, similar to Embodiment 6, the backlight module of Embodiment 7 does not have an obvious color shift. As shown in FIG. 1G, the area A7 which corresponds to the aforementioned areas A1 to A4 does not have the yellowish strips.

Compared with Embodiment 7, Embodiment 8 does not include the prism film above the optical wavelength conversion film. Therefore, the transmittance of the light in the upper region of the optical wavelength conversion film is improved to 43.26% while the transmittance in the lower region remains 5%, such that the ratio of the transmittance of the light in the upper region of the optical wavelength conversion film to the transmittance in the lower region is 865.2%. Compared with Embodiment 8, Embodiment 9 does not have the optical films disposed above the optical wavelength conversion film, but further includes a diffusion film under the optical wavelength conversion film. Therefore, the transmittance of the light in the upper region of the optical wavelength conversion film is improved to 48.50% while the transmittance in the lower region is adjusted to 4.93%, such that the ratio of the transmittance of the light in the upper region of the optical wavelength conversion film to the transmittance in the lower region is 983.7%. Likewise, this backlight module does not have an obvious color shift, either. The area A8 of FIG. 1H and the area A9 of FIG. 1I, which correspond to the aforementioned areas A1 to A4, do not have the yellowish strips.

It is known from the above that, when the backlight module does not have optical films disposed under the optical wavelength conversion film and the transmittance of the light in the lower region of the optical wavelength conversion film is significantly higher than the transmittance of the light in the upper region of the optical wavelength conversion film, the light emitted by the light source does not pass through any optical film before being converted by the optical wavelength conversion film. As a result, the light amount at the portion of the optical wavelength conversion film corresponding to the light source is larger than the light amount at the portion of the optical wavelength conversion film corresponding to the area around the light source and causes the brightness at the portion of the backlight module corresponding to the light source to be obviously different from the brightness at other portions. Thus, the backlight module has an obvious color shift, which results in a non-uniform light-emitting color. On the other hand, when the backlight module includes the optical films (e.g. the prism film, the diffusion film, or a combination thereof) disposed under the optical wavelength conversion film, the light emitted by the light source first passes through the optical film disposed under the optical wavelength conversion film to be reflected or refracted or uniformly diffused before being converted by the optical wavelength conversion film, and since the transmittance of the light in the lower region of the optical wavelength conversion film is reduced, the light does not easily pass. Thus, the difference between the light amount at the portion of the optical wavelength conversion film corresponding to the light source and the light amount at the portion of the optical wavelength conversion film corresponding to the area around the light source is reduced.

Based on the above, the optical films disposed between the optical wavelength conversion film and the light source are conducive to improving the color shift, such that the backlight module has a uniform light-emitting color. More specifically, according to the results shown in Table 1 and FIG. 1A through FIG. 1I, when the ratio of the transmittance of the light in the upper region of the optical wavelength conversion film to the transmittance of the light in the lower region of the optical wavelength conversion film is smaller than 10% (Embodiments 1-4, for example), the backlight module has obvious chroma non-uniformity; and when the ratio of the transmittance of the light in the upper region of the optical wavelength conversion film to the transmittance of the light in the lower region of the optical wavelength conversion film is larger than or equal to 45% (Embodiments 5-9, for example), the backlight module has a uniform light-emitting color. It is known from the foregoing results that the optical films disposed between the optical wavelength conversion film and the light source help to improve the color shift of the backlight module, and favorable results are achieved when the transmittance ratio is larger than or equal to 45%. It should be noted that the invention is not intended to limit the composition of the optical films, which may be adjusted as required where the aforementioned conditions are met.

With the features of the invention explained above, specific embodiments of the invention are described in detail hereinafter with reference to the figures.

Figure 2:
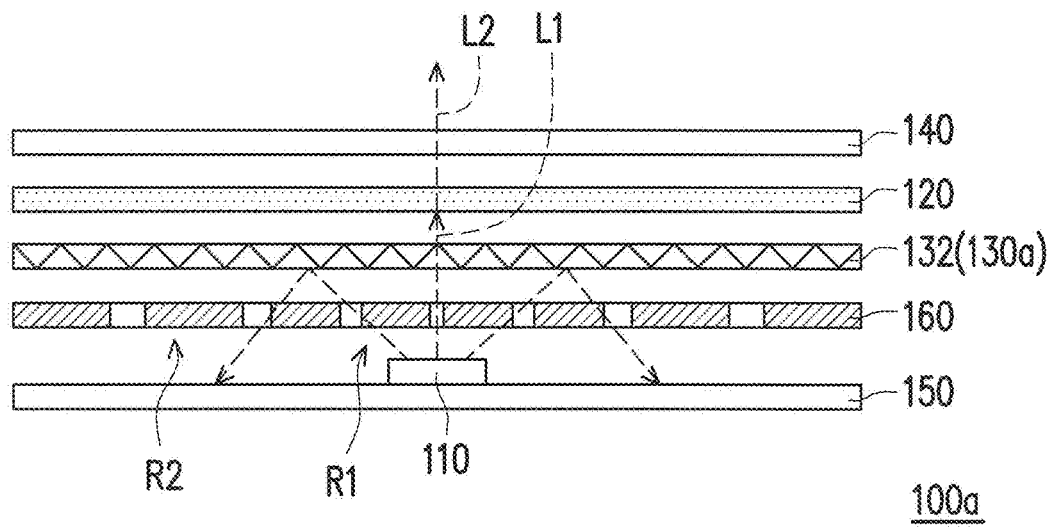
FIG. 2 is a schematic view illustrating a backlight module according to the first embodiment of the invention.

FIG. 2 is a schematic view illustrating a backlight module according to the first embodiment of the invention. With reference to FIG. 2, in this embodiment, a backlight module 100a includes a light source 110, an optical wavelength conversion film 120, a first group of optical films 130a, and a second group of optical films 140. The light source 110 is configured to emit a first light L1. The first group of optical films 130a is disposed between the light source 110 and the optical wavelength conversion film 120, and the optical wavelength conversion film 120 is disposed between the first group of optical films 130a and the second group of optical films 140. In other words, the first group of optical films 130a, the optical wavelength conversion film 120, and the second group of optical films 140 are disposed sequentially above the light source 110. Moreover, the optical wavelength conversion film 120 is configured to convert the first light L1 to a second light L2 having a different wavelength. Accordingly, the first light L1 emitted by the light source 110 passes through the first group of optical films 130a and then is converted by the optical wavelength conversion film 120 into the second light L2 having a different wavelength. Then, the second light L2 passes through the second group of optical films 140 and is emitted out of the backlight module 100a.

Specifically, in this embodiment, the light source 110 is a blue light emitting diode, for example. However, it should be noted that the invention is not intended to limit the type of the light source 110. The light source 110 is disposed on a substrate 150, wherein the substrate 150 is an assembly frame or other suitable substrates. Nevertheless, the invention is not intended to limit the type of the substrate 150 or whether the substrate 150 is disposed. FIG. 2 illustrates a situation where the backlight module 100a includes only one light source 110, but in other embodiments not illustrated here, the backlight module may include a plurality of light sources that are arranged continuously. However, it should be noted that the invention is not intended to limit the number of the light sources 110 and the configuration thereof. The light source 110 faces the first group of optical films 130a, the optical wavelength conversion film 120, and the second group of optical films 140, so as to direct the first light L1 emitted by the light source 110 toward the first group of optical films 130a, the optical wavelength conversion film 120, and the second group of optical films 140.

Further, in this embodiment, in order that the backlight module 100a achieves wide color gamut (WCG), a quantum dot enhancement film (QDEF) is used as the optical wavelength conversion film 120 of the backlight module 100a for converting the first light L1 emitted by the light source 110 into the second light L2 having a different wavelength to pass through the second group of optical films 140 and be emitted out of the backlight module 100a. For example, the blue light emitting diode that serves as the light source 110 is adapted to emit a blue light, and a portion of the blue light may be converted into a yellow light having a different wavelength by the optical wavelength conversion film 120, and then the blue light and the yellow light pass through the second group of optical films 140 and are mixed to form a white light to be emitted out of the backlight module 100a. However, the invention is not intended to limit the type of the optical wavelength conversion film 120. In other embodiments not illustrated here, the optical wavelength conversion film may be a phosphor-doped optical film, which is also capable of converting the light wavelength.

In addition, in this embodiment, the backlight module 100a further includes an optical control film 160 for modulating a distribution profile of the first light L1 emitted by the light source 110. The optical control film 160 is disposed between the first group of optical films 130a and the light source 110, and a light transmission amount of a first region R1 of the optical control film 160 is different from a light transmission amount of a second region R2. More specifically, the optical control film 160 is a perforated reflective film of high reflectivity, which has a plurality of perforations distributed thereon. The number or area of the perforations in the first region R1 is different from the number or area of the perforations in the second region R2, such that the light transmission amount of the first region R1 of the optical control film 160 is different from the light transmission amount of the second region R2 of the optical control film 160.

For example, in this embodiment, the first region R1 of the optical control film 160 has the lower light transmission amount while the second region R2 has the higher light transmission amount, wherein the first region R1 corresponds to the light source 110 and the second region R2 corresponds to the area around the light source 110 and surrounds the first region R1. That is, a portion of the optical control film 160 corresponding to the top of the light source 110 (i.e. the first region R1) has fewer or smaller perforations to allow lower light transmission amount, and a portion of the optical control film 160 not corresponding to the light source 110 (i.e. the second region R2) has more or larger perforations to allow higher light transmission amount. Thus, a large portion of the first light L1 emitted by the light source 110 is emitted toward the first region R1 of the optical control film 160, and a small portion of the first light L1 is emitted toward the second region R2. However, the first light L1 emitted toward the first region R1 does not easily pass through the first region R1 while the first light L1 emitted toward the second region R2 passes through the second region R2 more easily. Accordingly, the first light L1 emitted by the light source 110 first passes through the optical control film 160 for adjusting the distribution profile of the first light L1 and is then transmitted to the first group of optical films 130a. In other words, disposing the optical control film 160 helps to improve the uniformity of the first light L1.

However, a reflection effect of the first light L1 generated between the first region R1 having fewer or smaller perforations in the optical control film 160 (corresponding to the top of the light source 110) and the optical wavelength conversion film 120 is different from a reflection effect of the first light L1 generated between the second region R2 having more or larger perforations in the optical control film 160 and the optical wavelength conversion film 120. That is, due to the fewer or smaller perforations in the first region R1, the first light L1 does not pass through the perforations easily in the first region R1 and is reflected easily; and because of the more or larger perforations in the second region R2, the first light L1 passes through the perforations in the second region R2 easily and is not easily reflected. Therefore, after being reflected between the optical wavelength conversion film 120 and the first region R1, the first light L1 is more likely to be converted into the second light L2 by the optical wavelength conversion film 120. It is known from the above that, although use of the optical control film 160 that has different light transmission amounts in different regions helps to improve the uniformity of the first light L1, the optical control film 160 differentiates the reflection amounts of the first light L1 in different regions, and causes the backlight module 100a to have color shift at the portion corresponding to the top of the light source 110.

Accordingly, this embodiment uses the first group of optical films 130a to improve the color shift of the backlight module 100a, such that the backlight module 100a has a uniform light-emitting color. In other words, in this embodiment, the first group of optical films 130a is disposed between the optical control film 160 and the optical wavelength conversion film 120, such that light mixing occurs when the first light L1 passes through the optical control film 160 and the first group of optical films 130a, and after the light mixing, the first light L1 is converted by the optical wavelength conversion film 120 into the second light L2 to pass through the second group of optical films 140. Thus, the composition of the first group of optical films 130a and the relationship between the first group of optical films 130a and the second group of optical films 140 are used to adjust the light mixing effect and the uniformity of the light-emitting color of the backlight module 100a.

More specifically, in this embodiment, the first group of optical films 130a includes a prism film 132. Thus, after the first light L1 emitted by the light source 110 passes through the optical control film 160, a portion of the first light L1 is reflected by the prism film 132 in a direction toward the light source 110 to be mixed with the first light L1 subsequently emitted by the light source 110. It is known from the above that disposing the prism film 132 helps to improve the light mixing effect of the first light L1. Furthermore, the second group of optical films 140 may include a prism film, a diffusion film, a brightness enhancement film, or a combination of the foregoing. Although the second group of optical films 140 illustrated in FIG. 2 includes one single optical film, the second group of optical films 140 may be a combination of various optical films. The invention is not intended to limit the type and composition of the second group of optical films 140. Thereafter, the optical wavelength conversion film 120 converts the first light L1 after light mixing through the first group of optical films 130a (including the prism film 132) into the second light L2, and then the second light L2 passes through the second group of optical films 140 and is emitted out of the backlight module 100a.

Preferably, in this embodiment, the ratio of the transmittance of the second group of optical films 140 for the second light L2 to the transmittance of the first group of optical films 130a for the first light L1 is larger than or equal to 45%, but the invention is not limited thereto. In other words, the first light L1 after light mixing between the light source 110 and the first group of optical films 130a is converted into the second light L2 by the optical wavelength conversion film 120, and then the second light L2 passes through the second group of optical films 140 and is emitted out of the backlight module 100a uniformly. The ratio of the transmittance of the second group of optical films 140 for the second light L2 to the transmittance of the first group of optical films 130a for the first light L1 is 45% or more.

With the aforementioned design, in comparison with the conventional backlight module that uses a quantum dot enhancement film as the optical wavelength conversion film together with an optical control film, the backlight module 100a of this embodiment has the first group of optical films 130a that includes the prism film 132 between the optical wavelength conversion film 120 and the light source 110, such that a portion of the first light L1 is reflected in the direction toward the light source 110 by the prism film 132 to be mixed with the first light L1 subsequently emitted by the light source 110, so as to improve the light mixing effect of the first light L1. Accordingly, the first group of optical films 130a disposed between the optical wavelength conversion film 120 and the light source 110 helps to improve the color shift of the backlight module 100a, such that the backlight module 100a has a uniform light-emitting color. Moreover, the backlight module 100a further utilizes the specific ratio of the transmittance of the second group of optical films 140 for the second light L2 to the transmittance of the first group of optical films 130a for the first light L1 to improve the color shift. Nevertheless, the invention should not be construed as limited thereto.

Figure 3:
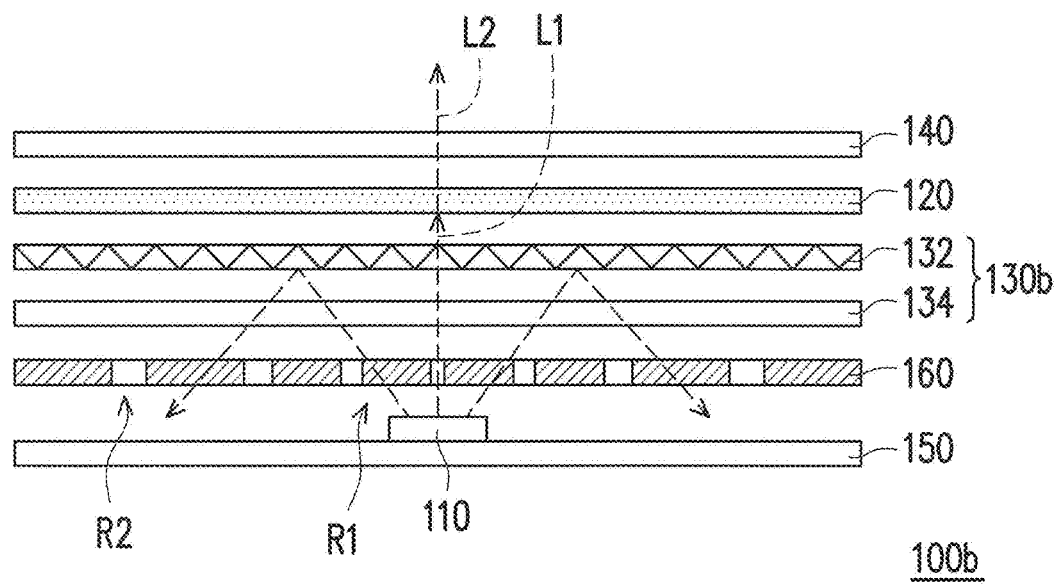
FIG. 3 is a schematic view illustrating a backlight module according to the second embodiment of the invention.

FIG. 3 is a schematic view illustrating a backlight module according to the second embodiment of the invention. With reference to FIG. 3, in this embodiment, a backlight module 100b includes a light source 110, an optical wavelength conversion film 120, a first group of optical films 130b, a second group of optical films 140, and an optical control film 160. A main difference between the backlight module 100b and the backlight module 100a is that: the first group of optical films 130b of this embodiment further includes a first diffusion film 134. Details regarding the light source 110, the optical wavelength conversion film 120, the second group of optical films 140, and the optical control film 160 have been specified above and thus are not repeated hereinafter.

Specifically, in this embodiment, the first group of optical films 130b includes a prism film 132 and the first diffusion film 134 that are stacked together and disposed between the optical wavelength conversion film 120 and the optical control film 160. Although FIG. 3 illustrates a situation where the prism film 132 is disposed above the first diffusion film 134 and located between the optical wavelength conversion film 120 and the first diffusion film 134, the invention is not intended to limit the positions of the prism film 132 and the first diffusion film 134, which may be adjusted as required to place the first diffusion film 134 above the prism film 132 and between the optical wavelength conversion film 120 and the prism film 132.

Thus, after the first light L1 emitted by the light source 110 passes through the optical control film 160, the first light L1 passes through the first diffusion film 134 and the prism film 132, such that a portion of the first light L1 is uniformly diffused by the first diffusion film 134 and reflected by the prism film 132 in the direction toward the light source 110 to be mixed with the first light L1 subsequently emitted by the light source 110. It is known from the above that disposing the prism film 132 and the first diffusion film 134 helps to improve the light mixing effect of the first light L1. Thereafter, the optical wavelength conversion film 120 converts the first light L1 after light mixing through the first group of optical films 130b (including the prism film 132 and the first diffusion film 134) into the second light L2. Then, the second light L2 passes through the second group of optical films 140 and is emitted out of the backlight module 100b uniformly.

With the aforementioned design, in comparison with the conventional backlight module that uses a quantum dot enhancement film as the optical wavelength conversion film together with an optical control film, the backlight module 100b of this embodiment has the first group of optical films 130a that includes the prism film 132 and the first diffusion film 134 between the optical wavelength conversion film 120 and the light source 110, so as to improve the light mixing effect of the first light L1. Accordingly, the first group of optical films 130b disposed between the optical wavelength conversion film 120 and the light source 110 helps to improve the color shift of the backlight module 100b, such that the backlight module 100b has a uniform light-emitting color. Moreover, the backlight module 100b further utilizes the specific ratio of the transmittance of the second group of optical films 140 for the second light L2 to the transmittance of the first group of optical films 130b for the first light L1 to improve the color shift. Nevertheless, the invention should not be construed as limited thereto.

Figure 4:
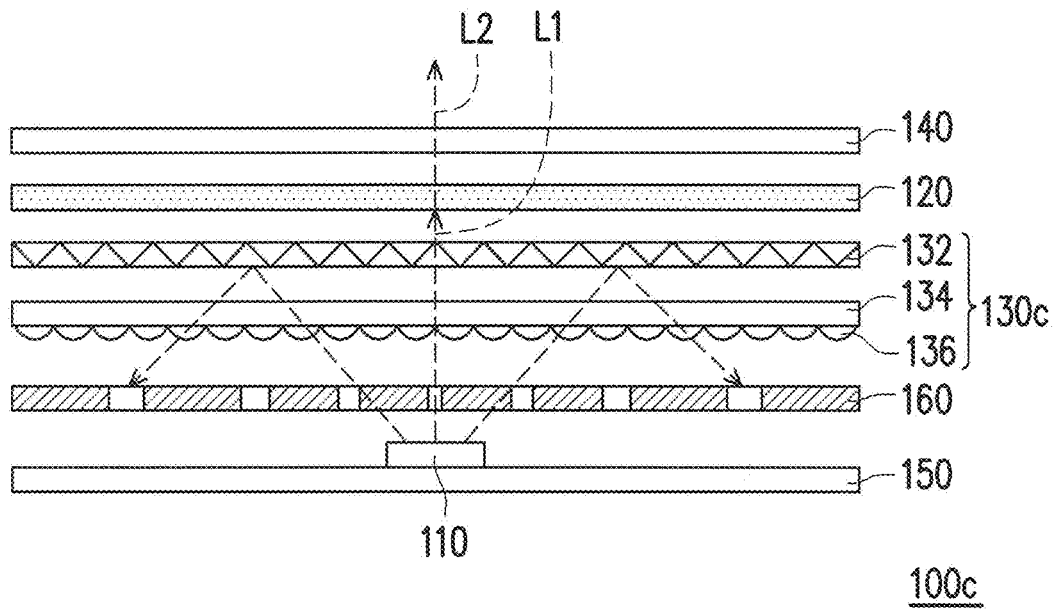
FIG. 4 is a schematic view illustrating a backlight module according to the third embodiment of the invention.

FIG. 4 is a schematic view illustrating a backlight module according to the third embodiment of the invention. With reference to FIG. 4, in this embodiment, a backlight module 100c includes a light source 110, an optical wavelength conversion film 120, a first group of optical films 130c, a second group of optical films 140, and an optical control film 160. A main difference between the backlight module 100c and the backlight modules 100a and 100b is that: the first group of optical films 130c of this embodiment further includes a first diffusion film 134, and a surface of the first diffusion film 134 has a plurality of dot patterns 136 thereon. Details regarding the light source 110, the optical wavelength conversion film 120, the second group of optical films 140, and the optical control film 160 have been specified above and thus are not repeated hereinafter.

Specifically, in this embodiment, the first group of optical films 130c includes a prism film 132 and the first diffusion film 134 that are stacked together and disposed between the optical wavelength conversion film 120 and the optical control film 160. The surface of the first diffusion film 134 has a plurality of dot patterns 136 that are distributed over the surface of the first diffusion film 134. The dot patterns 136 may be bump structures that are formed on the surface of the first diffusion film 134 by screen printing. However, it should be noted that the invention is not intended to limit the number, arrangement, and forming method of the dot patterns 136. Although FIG. 4 illustrates a situation where the prism film 132 is disposed above the first diffusion film 134 that has the dot patterns 136 and located between the optical wavelength conversion film 120 and the first diffusion film 134, the invention is not intended to limit the positions of the prism film 132 and the first diffusion film 134, which may be adjusted as required.

Thus, after the first light L1 emitted by the light source 110 passes through the optical control film 160, the first light L1 passes through the dot patterns 136, the first diffusion film 134, and the prism film 132, such that a portion of the first light L1 is uniformly diffused by the first diffusion film 134 and the dot patterns 136 and reflected by the dot patterns 136 and the prism film 132 in the direction toward the light source 110 to be mixed with the first light L1 subsequently emitted by the light source 110. Thus, it is known that disposing the prism film 132, the first diffusion film 134, and the dot patterns 136 helps to improve the light mixing effect of the first light L1. Thereafter, the optical wavelength conversion film 120 converts the first light L1 after light mixing through the first group of optical films 130c (including the prism film 132, the first diffusion film 134, and the dot patterns 136) into the second light L2. Then, the second light L2 passes through the second group of optical films 140 and is emitted out of the backlight module 100c uniformly.

With the aforementioned design, in comparison with the conventional backlight module that uses a quantum dot enhancement film as the optical wavelength conversion film together with an optical control film, the backlight module 100c of this embodiment has the first group of optical films 130c that includes the prism film 132, the first diffusion film 134, and the dot patterns 136 between the optical wavelength conversion film 120 and the light source 110, so as to improve the light mixing effect of the first light L1. Accordingly, the first group of optical films 130c disposed between the optical wavelength conversion film 120 and the light source 110 helps to improve the color shift of the backlight module 100c, such that the backlight module 100c has a uniform light-emitting color. Moreover, the backlight module 100c further utilizes the specific ratio of the transmittance of the second group of optical films 140 for the second light L2 to the transmittance of the first group of optical films 130c for the first light L1 to improve the color shift. Nevertheless, the invention should not be construed as limited thereto.

Figure 5:
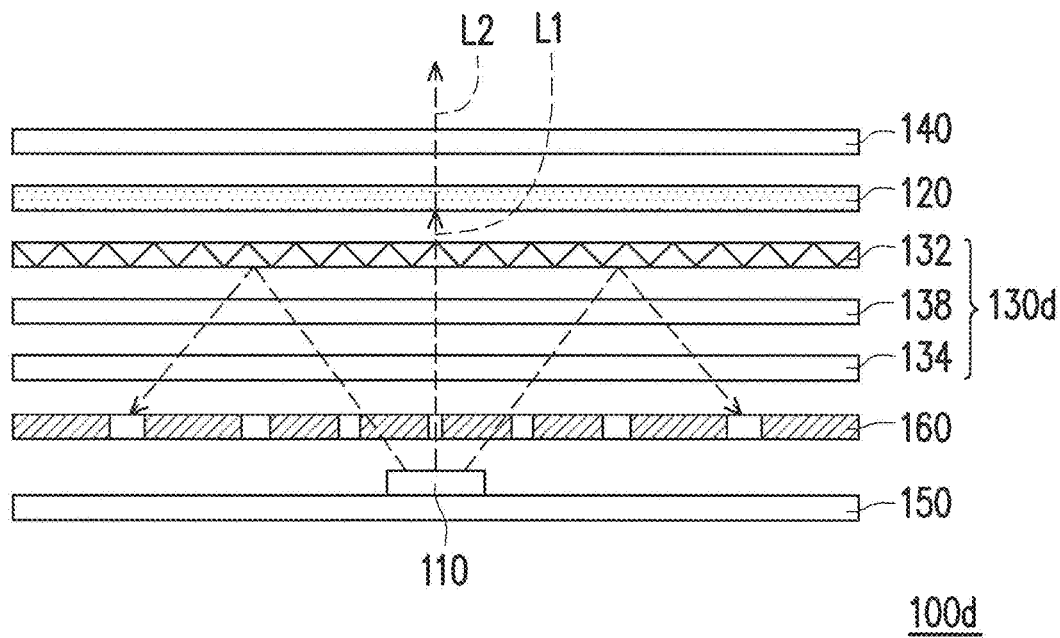
FIG. 5 is a schematic view illustrating a backlight module according to the fourth embodiment of the invention.

FIG. 5 is a schematic view illustrating a backlight module according to the fourth embodiment of the invention. With reference to FIG. 5, in this embodiment, a backlight module 100d includes a light source 110, an optical wavelength conversion film 120, a first group of optical films 130d, a second group of optical films 140, and an optical control film 160. A main difference between the backlight module 100d and the backlight modules 100a to 100c is that: the first group of optical films 130d of this embodiment further includes a first diffusion film 134 and a second diffusion film 138. Details regarding the light source 110, the optical wavelength conversion film 120, the second group of optical films 140, and the optical control film 160 have been specified above and thus are not repeated hereinafter.

More specifically, in this embodiment, the first group of optical films 130d includes a prism film 132, the first diffusion film 134, and the second diffusion film 138. The second diffusion film 138 is disposed between the first diffusion film 134 and the optical wavelength conversion film 120. Specifically, the first diffusion film 134, the second diffusion film 138, and the prism film 132 are stacked sequentially above the light source 110 and are disposed between the optical wavelength conversion film 120 and the optical control film 160. Although FIG. 5 illustrates a situation where the prism film 132 is disposed above the first diffusion film 134 and the second diffusion film 138 and located between the optical wavelength conversion film 120 and the first diffusion film 134 and the second diffusion film 138, the invention is not intended to limit the positions of the prism film 132, the first diffusion film 134, and the second diffusion film 138, which may be adjusted as required.

Thus, after the first light L1 emitted by the light source 110 passes through the optical control film 160, the first light L1 passes through the first diffusion film 134, the second diffusion film 138, and the prism film 132, such that a portion of the first light L1 is uniformly diffused by the first diffusion film 134 and the second diffusion film 138 and reflected by the prism film 132 in the direction toward the light source 110 to be mixed with the first light L1 subsequently emitted by the light source 110. Thus, it is known that disposing the prism film 132, the first diffusion film 134, and the second diffusion film 138 helps to improve the light mixing effect of the first light L1. Thereafter, the optical wavelength conversion film 120 converts the first light L1 after light mixing through the first group of optical films 130d (including the prism film 132, the first diffusion film 134, and the second diffusion film 138) into the second light L2. Then, the second light L2 passes through the second group of optical films 140 and is emitted out of the backlight module 100d uniformly.

Likewise, in other embodiments not illustrated here, the first diffusion film 134 and the second diffusion film 138 may have dot patterns 136 (as shown in FIG. 4) formed on surfaces thereof for reflecting a portion of the first light L1 in the direction toward the light source 110 to enhance the light mixing effect of the first light L1. The dot patterns 136 may or may not be disposed, which may be decided according to the actual requirements.

With the aforementioned design, in comparison with the conventional backlight module that uses a quantum dot enhancement film as the optical wavelength conversion film together with an optical control film, the backlight module 100d of this embodiment has the first group of optical films 130d that includes the prism film 132, the first diffusion film 134, and the second diffusion film 138 between the optical wavelength conversion film 120 and the light source 110, so as to improve the light mixing effect of the first light L1. Accordingly, the first group of optical films 130d disposed between the optical wavelength conversion film 120 and the light source 110 helps to improve the color shift of the backlight module 100d, such that the backlight module 100d has a uniform light-emitting color. Moreover, the backlight module 100d further utilizes the specific ratio of the transmittance of the second group of optical films 140 for the second light L2 to the transmittance of the first group of optical films 130d for the first light L1 to improve the color shift. Nevertheless, the invention should not be construed as limited thereto.

Figure 6:
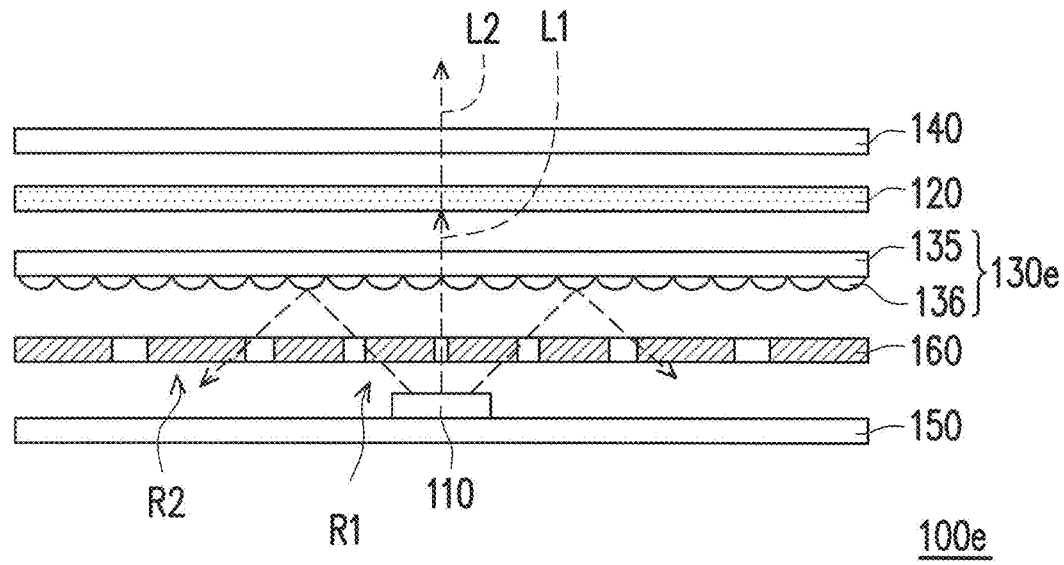
FIG. 6 is a schematic view illustrating a backlight module according to the fifth embodiment of the invention.

FIG. 6 is a schematic view illustrating a backlight module according to the fifth embodiment of the invention. With reference to FIG. 6, in this embodiment, a backlight module 100e includes a light source 110, an optical wavelength conversion film 120, a first group of optical films 130e, a second group of optical films 140, and an optical control film 160. A main difference between the backlight module 100e and the backlight modules 100a to 100d is that: the first group of optical films 130e of this embodiment includes a third diffusion film 135 instead of the prism film 132. Details regarding the light source 110, the optical wavelength conversion film 120, the second group of optical films 140, and the optical control film 160 have been specified above and thus are not repeated hereinafter.

Specifically, in this embodiment, the first group of optical films 130e includes the third diffusion film 135 that is disposed above the light source 110 and between the optical wavelength conversion film 120 and the optical control film 160. Preferably, a surface of the third diffusion film 135 has the aforementioned dot patterns 136 thereon. Details regarding the dot patterns 136 have been specified above and thus are not repeated hereinafter. Nevertheless, the invention is not intended to limit whether the surface of the third diffusion film 135 has the dot patterns 136 formed thereon, which may be decided according to the actual requirement.

Thus, after the first light L1 emitted by the light source 110 passes through the optical control film 160, the first light L1 passes through the third diffusion film 135 and the dot patterns 136, such that a portion of the first light L1 is uniformly diffused by the third diffusion film 135 and reflected by the dot patterns 136 on the third diffusion film 135 in the direction toward the light source 110 to be mixed with the first light L1 subsequently emitted by the light source 110. Therefore, it is known that disposing the third diffusion film 135 and the dot patterns 136 helps to improve the light mixing effect of the first light L1. Thereafter, the optical wavelength conversion film 120 converts the first light L1 after light mixing through the first group of optical films 130e (including the third diffusion film 135 and the dot patterns 136, or the third diffusion film 135 not having the dot patterns 136) into the second light L2. Then, the second light L2 passes through the second group of optical films 140 and is emitted out of the backlight module 100e uniformly.

With the aforementioned design, in comparison with the conventional backlight module that uses a quantum dot enhancement film as the optical wavelength conversion film together with an optical control film, the backlight module 100e of this embodiment has the first group of optical films 130e that includes the third diffusion film 135 having the dot patterns 136 (or the third diffusion film 135 not having the dot patterns 136) between the optical wavelength conversion film 120 and the light source 110, so as to improve the light mixing effect of the first light L1. Accordingly, the first group of optical films 130e disposed between the optical wavelength conversion film 120 and the light source 110 helps to improve the color shift of the backlight module 100e, such that the backlight module 100e has a uniform light-emitting color. Moreover, the backlight module 100e further utilizes the specific ratio of the transmittance of the second group of optical films 140 for the second light L2 to the transmittance of the first group of optical films 130e for the first light L1 to improve the color shift. Nevertheless, the invention should not be construed as limited thereto.

Figure 7:
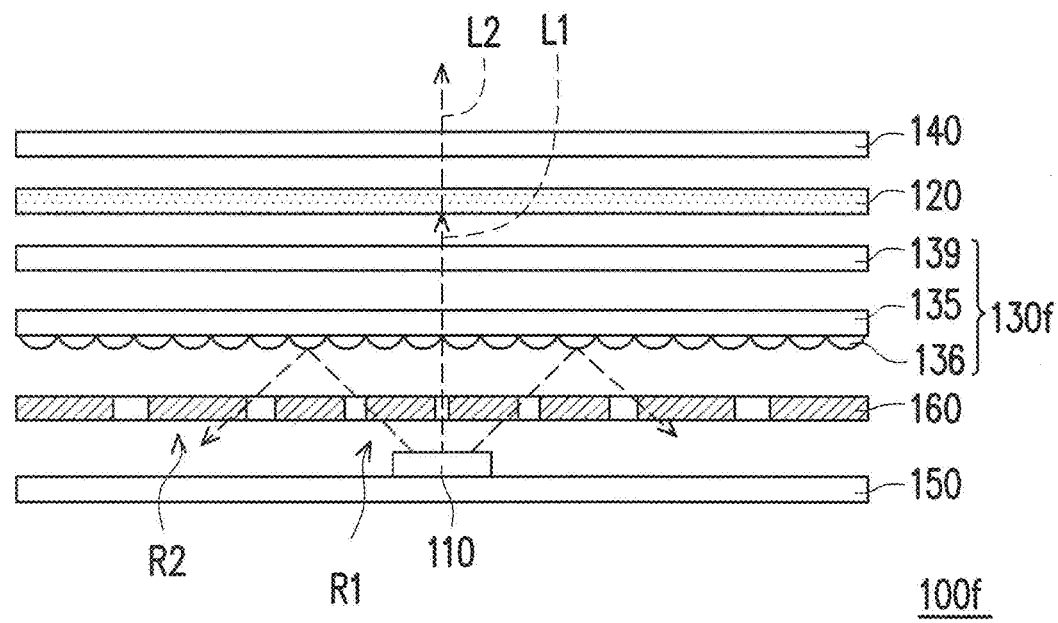
FIG. 7 is a schematic view illustrating a backlight module according to the sixth embodiment of the invention.

FIG. 7 is a schematic view illustrating a backlight module according to the sixth embodiment of the invention. With reference to FIG. 7, in this embodiment, a backlight module 100f includes a light source 110, an optical wavelength conversion film 120, a first group of optical films 130f, a second group of optical films 140, and an optical control film 160. A main difference between the backlight module 100f and the backlight modules 100a to 100e is that: the first group of optical films 130f of this embodiment includes a third diffusion film 135 and a fourth diffusion film 139, instead of the prism film 132. Details regarding the light source 110, the optical wavelength conversion film 120, the second group of optical films 140, and the optical control film 160 have been specified above and thus are not repeated hereinafter.

Specifically, in this embodiment, the first group of optical films 130f includes the third diffusion film 135 and the fourth diffusion film 139, wherein the third diffusion film 135 is disposed between the light source 110 and the optical wavelength conversion film 120, and the fourth diffusion film 139 is disposed between the third diffusion film 135 and the optical wavelength conversion film 120. That is to say, the third diffusion film 135 and the fourth diffusion film 139 are disposed sequentially above the light source 110 and disposed between the optical control film 160 and the optical wavelength conversion film 120. However, it should be noted that the invention is not intended to limit the positions of the third diffusion film 135 and the fourth diffusion film 139, which may be adjusted as required. Preferably, a surface of the third diffusion film 135 has a plurality of the aforementioned dot patterns 136 thereon. Details regarding the dot patterns 136 have been specified above and thus are not repeated hereinafter. The invention is not intended to limit whether the surface of the third diffusion film 135 has the dot patterns 136 formed thereon, which may be decided according to the actual requirement.

Thus, after the first light L1 emitted by the light source 110 passes through the optical control film 160, the first light L1 passes through the third diffusion film 135, the fourth diffusion film 139, and the dot patterns 136, such that a portion of the first light L1 is uniformly diffused by the third diffusion film 135 and the fourth diffusion film 139 and reflected by the dot patterns 136 on the third diffusion film 135 in the direction toward the light source 110 to be mixed with the first light L1 subsequently emitted by the light source 110. Therefore, it is known that disposing the third diffusion film 135, the fourth diffusion film 139, and the dot patterns 136 helps to improve the light mixing effect of the first light L1.

Though not illustrated in FIG. 7, a surface of the fourth diffusion film 139 of this embodiment may also have the aforementioned dot patterns 136 thereon as required. The invention is not intended to limit whether the surface of the fourth diffusion film 139 has the dot patterns 136 formed thereon, which may be decided according to the actual requirement. Accordingly, the optical wavelength conversion film 120 converts the first light L1 after light mixing through the first group of optical films 130f (including the third diffusion film 135, the fourth diffusion film 139, and the dot patterns 136) into the second light L2. Then, the second light L2 passes through the second group of optical films 140 and is emitted out of the backlight module 100f uniformly.

With the aforementioned design, in comparison with the conventional backlight module that uses a quantum dot enhancement film as the optical wavelength conversion film together with an optical control film, the backlight module 100f of this embodiment has the first group of optical films 130f that includes the third diffusion film 135 having the dot patterns 136 and the fourth diffusion film 139 not having the dot patterns 136 (or the third diffusion film 135 and the fourth diffusion film 139 neither having the dot patterns 136; or the third diffusion film 135 and the fourth diffusion film 139 both having the dot patterns 136) between the optical wavelength conversion film 120 and the light source 110, so as to improve the light mixing effect of the first light L1. Accordingly, the first group of optical films 130f disposed between the optical wavelength conversion film 120 and the light source 110 helps to improve the color shift of the backlight module 100f, such that the backlight module 100f has a uniform light-emitting color. Moreover, the backlight module 100f further utilizes the specific ratio of the transmittance of the second group of optical films 140 for the second light L2 to the transmittance of the first group of optical films 130f for the first light L1 to improve the color shift. Nevertheless, the invention should not be construed as limited thereto.

Figure 8:
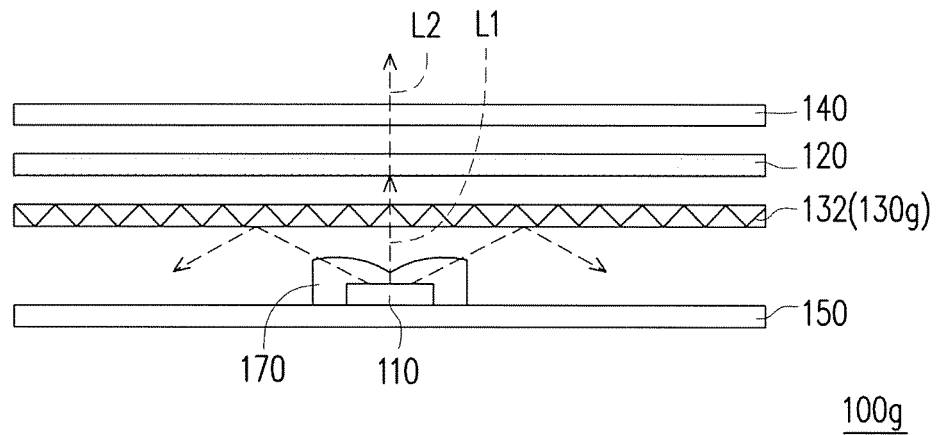
FIG. 8 is a schematic view illustrating a backlight module according to the seventh embodiment of the invention.

FIG. 8 is a schematic view illustrating a backlight module according to the seventh embodiment of the invention. With reference to FIG. 8, in this embodiment, a backlight module 100g includes a light source 110, an optical wavelength conversion film 120, a first group of optical films 130g, a second group of optical films 140, and a lens 170. The light source 110 is adapted to emit a first light L1. The optical wavelength conversion film 120 is adapted to convert the first light L1 into a second light L2 having a different wavelength. The first group of optical films 130g is disposed between the light source 110 and the optical wavelength conversion film 120, and the optical wavelength conversion film 120 is disposed between the first group of optical films 130g and the second group of optical films 140. A main difference between the backlight module 100g and the backlight modules 100a to 100f is that: the backlight module 100g of this embodiment includes the lens 170 instead of the aforementioned optical control film 160 (as shown in FIG. 2 to FIG. 7). Details regarding the light source 110, the optical wavelength conversion film 120, and the second group of optical films 140 have been specified above and thus are not repeated hereinafter.

Specifically, in this embodiment, the lens 170 is disposed between the light source 110 and the first group of optical films 130g to reflect or refract the first light L1. Thus, it is known that the lens 170, the first group of optical films 130g, the optical wavelength conversion film 120, and the second group of optical films 140 are disposed sequentially above the light source 110. To be more specific, the lens 170 is disposed on the substrate 150 and covers the light source 110. The lens 170 is a transmissive lens or a reflective lens, for example. Nevertheless, the invention is not intended to limit the type of the lens 170. Since the lens 170 is capable of reflecting or refracting the first light L1, the lens 170 uniformizes the light-emitting color of the backlight module 100g. In other words, disposing the lens 170 helps to improve the uniformity of the first light L1.

Likewise, in this embodiment, a reflection effect of the first light L1 generated between the optical wavelength conversion film 120 and the lens 170 (corresponding to the top of the light source 110) is different from a reflection effect of the first light L1 generated between the optical wavelength conversion film 120 and other regions around the lens 170. Although use of the lens 170 helps to improve the uniformity of the first light L1, the lens 170 differentiates the reflection amounts of the first light L1 in different regions, and causes the backlight module 100g to have color shift at the portion corresponding to the top of the light source 110.

Accordingly, this embodiment uses the first group of optical films 130g to improve the color shift of the backlight module 100g, such that the backlight module 100g has a uniform light-emitting color. In other words, in this embodiment, the first group of optical films 130g is disposed between the lens 170 and the optical wavelength conversion film 120, such that light mixing occurs when the first light L1 passes through the lens 170 and the first group of optical films 130g, and after the light mixing, the first light L1 is converted by the optical wavelength conversion film 120 into the second light L2 to pass through the second group of optical films 140, so as to improve the color shift of the backlight module 100g.

Specifically, in this embodiment, the first group of optical films 130g includes a prism film 132 that is disposed between the lens 170 and the optical wavelength conversion film 120. Details regarding the prism film 132 have been specified above and thus are not repeated hereinafter. Thus, after the first light L1 emitted by the light source 110 passes through the lens 170, the first light L1 passes through the prism film 132 and a portion of the first light L1 is reflected by the prism film 132 in the direction toward the light source 110 to be mixed with the first light L1 subsequently emitted by the light source 110. Therefore, it is known that disposing the prism film 132 helps to improve the light mixing effect of the first light L1. Thereafter, the optical wavelength conversion film 120 converts the first light L1 after light mixing through the first group of optical films 130g (including the prism film 132) into the second light L2, and then the second light L2 passes through the second group of optical films 140 and is emitted out of the backlight module 100g.

With the aforementioned design, in comparison with the conventional backlight module that uses a quantum dot enhancement film as the optical wavelength conversion film, the backlight module 100g of this embodiment has the first group of optical films 130g that includes the prism film 132 between the optical wavelength conversion film 120 and the light source 110, so as to improve the light mixing effect of the first light L1. Accordingly, the first group of optical films 130g disposed between the optical wavelength conversion film 120 and the light source 110 helps to improve the color shift of the backlight module 100g, such that the backlight module 100g has a uniform light-emitting color. Moreover, the backlight module 100g further utilizes the specific ratio of the transmittance of the second group of optical films 140 for the second light L2 to the transmittance of the first group of optical films 130g for the first light L1 to improve the color shift. Nevertheless, the invention should not be construed as limited thereto.

Figure 9:
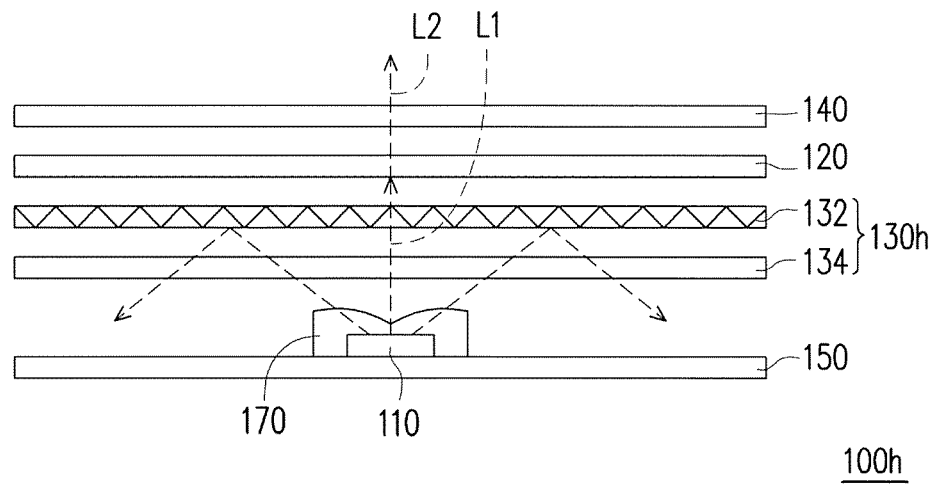
FIG. 9 is a schematic view illustrating a backlight module according to the eighth embodiment of the invention.

FIG. 9 is a schematic view illustrating a backlight module according to the eighth embodiment of the invention. With reference to FIG. 9, in this embodiment, a backlight module 100h includes a light source 110, an optical wavelength conversion film 120, a first group of optical films 130h, a second group of optical films 140, and a lens 170. A main difference between the backlight module 100h and the backlight module 100g is that: the first group of optical films 130h of this embodiment further includes a first diffusion film 134. Details regarding the light source 110, the optical wavelength conversion film 120, the second group of optical films 140, and the lens 170 have been specified above and thus are not repeated hereinafter.

Specifically, in this embodiment, the first group of optical films 130h includes a prism film 132 and the first diffusion film 134 that are stacked together and disposed between the lens 170 and the optical wavelength conversion film 120. Although FIG. 9 illustrates a situation where the prism film 132 is disposed above the first diffusion film 134 and located between the optical wavelength conversion film 120 and the first diffusion film 134, the invention is not intended to limit the relative positions of the prism film 132 and the first diffusion film 134, which may be adjusted as required to place the first diffusion film 134 above the prism film 132. Details regarding the prism film 132 and the first diffusion film 134 have been specified above and thus are not repeated hereinafter.

Thus, after the first light L1 emitted by the light source 110 passes through the lens 170, the first light L1 passes through the first diffusion film 134 and the prism film 132, such that a portion of the first light L1 is uniformly diffused by the first diffusion film 134 and reflected by the prism film 132 in the direction toward the light source 110 to be mixed with the first light L1 subsequently emitted by the light source 110. Therefore, it is known that disposing the prism film 132 and the first diffusion film 134 helps to improve the light mixing effect of the first light L1. Thereafter, the optical wavelength conversion film 120 converts the first light L1 after light mixing through the first group of optical films 130h (including the prism film 132 and the first diffusion film 134) into the second light L2. Then, the second light L2 passes through the second group of optical films 140 and is emitted out of the backlight module 100h uniformly.

Likewise, in other embodiments not illustrated here, the first diffusion film 134 may have dot patterns 136 (as shown in FIG. 4) formed on a surface thereof for reflecting a portion of the first light L1 in the direction toward the light source 110 to enhance the light mixing effect of the first light L1. The dot patterns 136 may or may not be disposed, which may be decided according to the actual requirements.

With the aforementioned design, in comparison with the conventional backlight module that uses a quantum dot enhancement film as the optical wavelength conversion film, the backlight module 100h of this embodiment has the first group of optical films 130h that includes the prism film 132 and the first diffusion film 134 between the optical wavelength conversion film 120 and the light source 110, so as to improve the light mixing effect of the first light L1. Accordingly, the first group of optical films 130h disposed between the optical wavelength conversion film 120 and the light source 110 helps to improve the color shift of the backlight module 100h, such that the backlight module 100h has a uniform light-emitting color. Moreover, the backlight module 100h further utilizes the specific ratio of the transmittance of the second group of optical films 140 for the second light L2 to the transmittance of the first group of optical films 130h for the first light L1 to improve the color shift. Nevertheless, the invention should not be construed as limited thereto.

Figure 10:
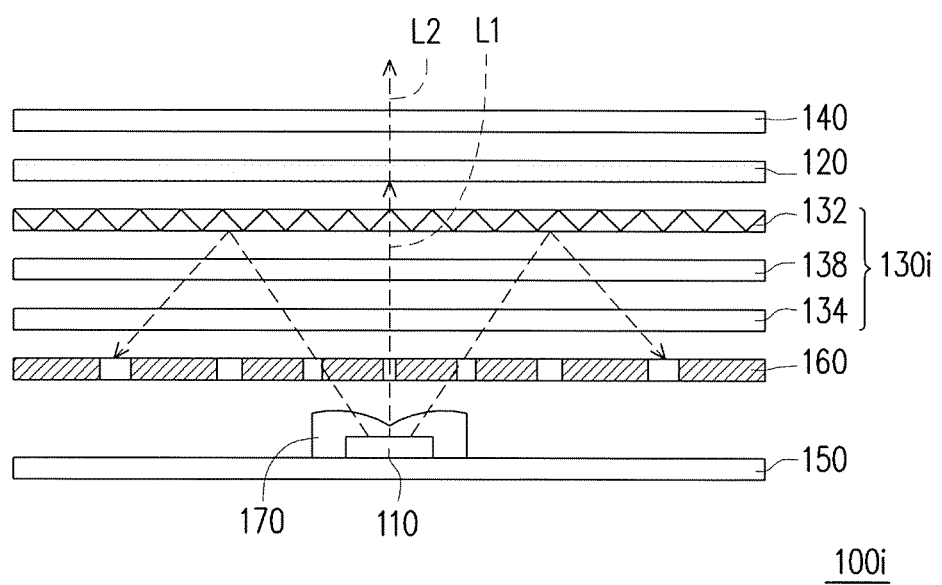
FIG. 10 is a schematic view illustrating a backlight module according to the ninth embodiment of the invention.

FIG. 10 is a schematic view illustrating a backlight module according to the ninth embodiment of the invention. With reference to FIG. 10, in this embodiment, a backlight module 100i includes a light source 110, an optical wavelength conversion film 120, a first group of optical films 130i, a second group of optical films 140, and a lens 170. A main difference between the backlight module 100i and the backlight modules 100g and 100h is that: the first group of optical films 130i of this embodiment further includes a first diffusion film 134 and a second diffusion film 138. Details regarding the light source 110, the optical wavelength conversion film 120, the second group of optical films 140, and the lens 170 have been specified above and thus are not repeated hereinafter.

Specifically, in this embodiment, the first group of optical films 130i includes a prism film 132, the first diffusion film 134, and the second diffusion film 138, wherein the second diffusion film 138 is disposed between the first diffusion film 134 and the optical wavelength conversion film 120 while the prism film 132, the first diffusion film 134, and the second diffusion film 138 are disposed between the lens 170 and the optical wavelength conversion film 120. That is, the first diffusion film 134, the second diffusion film 138, and the prism film 132 are sequentially disposed above the light source 110 and are located between the lens 170 and the optical wavelength conversion film 120. Although FIG. 10 illustrates a situation where the prism film 132 is disposed above the first diffusion film 134 and the second diffusion film 138, the invention is not intended to limit the relative positions of the prism film 132, the first diffusion film 134, and the second diffusion film 138, which may be adjusted as required to place the first diffusion film 134 and the second diffusion film 138 above the prism film 132. Details regarding the prism film 132, the first diffusion film 134, and the second diffusion film 138 have been specified above and thus are not repeated hereinafter.

Thus, after the first light L1 emitted by the light source 110 passes through the lens 170, the first light L1 passes through the first diffusion film 134, the second diffusion film 138, and the prism film 132, such that a portion of the first light L1 is uniformly diffused by the first diffusion film 134 and the second diffusion film 138 and reflected by the prism film 132 in the direction toward the light source 110 to be mixed with the first light L1 subsequently emitted by the light source 110. Thus, it is known that disposing the prism film 132, the first diffusion film 134, and the second diffusion film 138 helps to improve the light mixing effect of the first light L1. Thereafter, the optical wavelength conversion film 120 converts the first light L1 after light mixing through the first group of optical films 130i (including the prism film 132, the first diffusion film 134, and the second diffusion film 138) into the second light L2. Then, the second light L2 passes through the second group of optical films 140 and is emitted out of the backlight module 100i uniformly.

Likewise, in other embodiments not illustrated here, the first diffusion film 134 and the second diffusion film 138 may have dot patterns 136 (as shown in FIG. 4) formed on surfaces thereof for reflecting a portion of the first light L1 in the direction toward the light source 110 to enhance the light mixing effect of the first light L1. The dot patterns 136 may or may not be disposed, which may be decided according to the actual requirements.

With the aforementioned design, in comparison with the conventional backlight module that uses a quantum dot enhancement film as the optical wavelength conversion film, the backlight module 100i of this embodiment has the first group of optical films 130i that includes the prism film 132, the first diffusion film 134, and the second diffusion film 138 between the optical wavelength conversion film 120 and the light source 110, so as to improve the light mixing effect of the first light L1. Accordingly, the first group of optical films 130i disposed between the optical wavelength conversion film 120 and the light source 110 helps to improve the color shift of the backlight module 100i, such that the backlight module 100i has a uniform light-emitting color. Moreover, the backlight module 100i further utilizes the specific ratio of the transmittance of the second group of optical films 140 for the second light L2 to the transmittance of the first group of optical films 130i for the first light L1 to improve the color shift. Nevertheless, the invention should not be construed as limited thereto.

In conclusion, the backlight module of the invention includes the first group of optical films and the second group of optical films that are respectively disposed on two opposite sides of the optical wavelength conversion film, such that the first light emitted by the light source is converted by the optical wavelength conversion film into the second light having a different wavelength after passing through the first group of optical films, and then the second light passes through the second group of optical films. In other words, the optical wavelength conversion film and the light source have the first group of optical films therebetween. The first group of optical films may include the prism film, the diffusion film, or a combination of the foregoing, and the diffusion film may have the dot patterns thereon, such that the first light emitted by the light source is uniformly diffused or reflected in the direction toward the light source by the first group of optical films to achieve the light mixing effect. That is, the optical films disposed between the optical wavelength conversion film and the light source help to improve the color shift of the backlight module. Preferably, the ratio of the transmittance of the second group of optical films for the second light to the transmittance of the first group of optical films for the first light is larger than or equal to 45%. Accordingly, the backlight module of the invention utilizes the specific ratio of the transmittance of the second group of optical films for the second light to the transmittance of the first group of optical films for the first light to improve the color shift, so as to produce a uniform light-emitting color.

It will be apparent to those skilled in the art that various modifications and variations can be made to the disclosed embodiments without departing from the scope or spirit of the invention. In view of the foregoing, it is intended that the invention covers modifications and variations provided that they fall within the scope of the following claims and their equivalents.

What is claimed is:

1. A backlight module, comprising:
a light source emitting a first light;
an optical wavelength conversion film;
a first group of optical films disposed between the light source and the optical wavelength conversion film, wherein a portion of the first light is reflected by the first group of optical films in a direction toward the light source to be mixed with the first light subsequently emitted by the light source;
an optical control film disposed between the first group of optical films and the light source, wherein the optical control film and the first group of optical films are disposed separately from each other; and
a second group of optical films, wherein the optical wavelength conversion film is disposed between the first group of optical films and the second group of optical films, and the first light is converted into a second light having a different wavelength by the optical wavelength conversion film after passing through the first group of optical films and the second light passes through the second group of optical films, wherein a ratio of a transmittance of the second group of optical films for the second light to a transmittance of the first group of optical films for the first light is larger than 46.8%.

2. The backlight module according to claim 1, further comprising:
a lens disposed between the light source and the first group of optical films to reflect or refract the first light.

3. The backlight module according to claim 1, wherein the first group of optical films comprises a prism film.

4. The backlight module according to claim 3, wherein the first group of optical films further comprises a first diffusion film.

5. The backlight module according to claim 4, wherein a surface of the first diffusion film comprises a plurality of dot patterns.

6. The backlight module according to claim 4, wherein the first group of optical films further comprises a second diffusion film disposed between the first diffusion film and the optical wavelength conversion film.

7. The backlight module according to claim 6, wherein a surface of the second diffusion film comprises a plurality of dot patterns.

8. The backlight module according to claim 1, wherein the first group of optical films comprises a third diffusion film.

9. The backlight module according to claim 8, wherein a surface of the third diffusion film comprises a plurality of dot patterns.

10. The backlight module according to claim 9, wherein the first group of optical films further comprises a fourth diffusion film disposed between the third diffusion film and the optical wavelength conversion film.

11. The backlight module according to claim 10, wherein a surface of the fourth diffusion film comprises a plurality of dot patterns.

12. The backlight module according to claim 1, wherein the first group of optical films comprises a prism film or a diffusion film, and wherein the transmittance of the second group of optical films for the second light is greater than 4.68% while the transmittance of the first group of optical films for the first light is smaller than 10%.

13. The backlight module according to claim 1, wherein a light transmission amount of a first region of the optical control film is lower than a light transmission amount of a second region of the optical control film, and the first region corresponds to the light source and the second region corresponds to an area around the light source and surrounds the first region.

14. A backlight module, comprising:
a light source emitting a first light;
an optical wavelength conversion film converting the first light into a second light having a different wavelength;
a first group of optical films disposed between the light source and the optical wavelength conversion film, wherein the first group of optical films comprises a prism film, and wherein a portion of the first light is reflected by the prism film in a direction toward the light source to be mixed with the first light subsequently emitted by the light source;

a second group of optical films, wherein the optical wavelength conversion film is disposed between the first group of optical films and the second group of optical films, wherein a ratio of a transmittance of the second group of optical films for the second light to a transmittance of the first group of optical films for the first light is larger than 46.8%; and an optical control film disposed between the first group of optical films and the light source, wherein the optical control film and the first group of optical films are disposed separately from each other, a light transmission amount of a first region of the optical control film is lower than a light transmission amount of a second region of the optical control film, and the first region corresponds to the light source and the second region corresponds to an area around the light source and surrounds the first region.

15. The backlight module according to claim 14, wherein the first group of optical films further comprises a first diffusion film.

16. The backlight module according to claim 15, wherein a surface of the first diffusion film comprises a plurality of dot patterns.

17. The backlight module according to claim 15, wherein the first group of optical films further comprises a second diffusion film disposed between the first diffusion film and the optical wavelength conversion film.

18. The backlight module according to claim 17, wherein a surface of the second diffusion film comprises a plurality of dot patterns.

19. A backlight module, comprising:
a light source emitting a first light;
an optical wavelength conversion film converting the first light into a second light having a different wavelength;
a first group of optical films disposed between the light source and the optical wavelength conversion film, wherein the first group of optical films comprises a prism film;

an optical control film disposed between the first group of optical films and the light source, wherein the optical control film and the first group of optical films are disposed separately from each other, a light transmission amount of a first region of the optical control film is lower than a light transmission amount of a second region of the optical control film, and the first region corresponds to the light source and the second region corresponds to an area around the light source and surrounds the first region;

a second group of optical films, wherein the optical wavelength conversion film is disposed between the first group of optical films and the second group of optical films, wherein a ratio of a transmittance of the second group of optical films for the second light to a transmittance of the first group of optical films for the first light is larger than 46.8%; and a lens disposed between the light source and the first group of optical films to reflect or refract the first light, wherein the lens covers the light source.

20. The backlight module according to claim 19, wherein the first group of optical films further comprises a first diffusion film.

21. The backlight module according to claim 20, wherein a surface of the first diffusion film comprises a plurality of dot patterns.

22. The backlight module according to claim 20, wherein the first group of optical films further comprises a second diffusion film disposed between the first diffusion film and the optical wavelength conversion film.

23. The backlight module according to claim 22, wherein a surface of the second diffusion film comprises a plurality of dot patterns.

* * * * *